US006574607B1

(12) United States Patent
Carter et al.

(10) Patent No.: US 6,574,607 B1
(45) Date of Patent: Jun. 3, 2003

(54) PERFORMING COMPUTER-BASED ON-LINE COMMERCE USING AN INTELLIGENT AGENT TO PUT TOGETHER A PACKAGE OF RELATED ITEMS

(75) Inventors: John Mervyn Carter, Chilworth (GB); Edmund James Whittaker West, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 09/034,067

(22) Filed: Mar. 3, 1997

(30) Foreign Application Priority Data

Aug. 23, 1997 (GB) .............................. 9717899

(51) Int. Cl.[7] .............................. G06F 17/60
(52) U.S. Cl. ...................................... 705/26
(58) Field of Search .......................... 705/26

(56) References Cited

U.S. PATENT DOCUMENTS

| 4,799,156 A | * | 1/1989 | Shavit et al. | |
|---|---|---|---|---|
| 5,696,965 A | * | 12/1997 | Dedrick | |
| 5,732,398 A | * | 3/1998 | Tagawa | |
| 5,754,850 A | * | 5/1998 | Janssen | |
| 5,870,745 A | * | 2/1999 | McCune | |
| 5,983,200 A | * | 11/1999 | Slotznick | 705/26 |

FOREIGN PATENT DOCUMENTS

| EP | 0 845 748 A2 | * | 6/1998 |
|---|---|---|---|
| GB | 2289598 | | 11/1995 |

OTHER PUBLICATIONS

Fred Hapgood, I'll Have What She's Having, WebMaster Magazine, Dec. 1996.*
Muzak Rises from Elevator music to Net Music Service, Discount Store News, vol. 35, No. 9, May 6, 1996, p. 21.*
Annika Woern, "What is an Intelligent Interface?", http://www.sics.se/~annika/papers/intint.html, Mar. 1997.*
Leonard N. Foner, "Entertaining Agents: A Sociological Case Study", The First International Conference on Autonomous Agents, Marina del Ray, CA, ACM, 1997.*
IBM Corporation, "Dynamic Control of Intelligent Agents Rules" http://www.spi.org. IBM TDB v38 n4 04–95 p541–544, Apr. 1995.*
IBM Corporation, "Object and Database Structure of Rule-based Intelligent Agent." http://www.spi.org. IBM TDB n10a 03–91 p308, Mar. 1991.*
IBM Corporation, "Intelligent Library Filter for Office." http://www.spi.org. IBM TDB n4b 09–91 p32–33, Sep. 1991.*

* cited by examiner

Primary Examiner—Richard Chilcot
Assistant Examiner—Jennifer I. Harle
(74) Attorney, Agent, or Firm—Gregory M. Doudnikoff

(57) ABSTRACT

A method of performing computer-based on-line commerce in which a client computer issues a group of interrelated commercial requests and each one of a plurality of server computers is available to service at least one of said requests, said method, performed by an intelligent agent, comprising steps of: receiving the group of interrelated commercial requests from said client computer; and finding servers which will satisfy said group of requests using client preference levels indicating for each request at least one preferred value which the client would like the agent to use in finding a server to satisfy that request; characterized in that said finding step also uses a client significance level indicating for a corresponding request the relative significance of this request in comparison to the other requests in the group.

9 Claims, 3 Drawing Sheets

PERFORMING COMPUTER-BASED ON-LINE COMMERCE USING AN INTELLIGENT AGENT TO PUT TOGETHER A PACKAGE OF RELATED ITEMS

FIELD OF THE INVENTION

The present invention relates to computer-based on-line commerce, where a computer user buys goods or services through his computer by linking his computer with that of a seller through a computer network.

BACKGROUND OF THE INVENTION

As networks of linked computers become an increasingly more prevalent concept in everyday life, so-called "on-line" interactions between computer users has begun to spread into many different areas of our lives. One of these areas is the marketplace for goods and services.

In the past couple of years there has been an explosive growth in the use of the globally-linked network of computers known as the Internet, and in particular of the WorldWide Web (WWW), which is one of the facilities provided on top of the Internet. The WWW comprises many pages or files of information, distributed across many different server computer systems. Information stored on such pages can be, for example, details of a company's organization, contact data, product data and company news. This information can be presented to the user's computer system ("client computer system") using various types of data in combination, for example, text, graphics, audio data and video data. Each page is identified by a Universal Resource Locator (URL). The URL denotes both the server machine, and the particular file or page on that machine. There may be many pages or URLs resident on a single server.

In order to use the WWW, a client computer system runs a piece of software known as a Web browser, such as WebExplorer (provided as part of the OS/2 operating system from IBM Corporation), or the Navigator program available from Netscape Communications Corporation. "WebExplorer", "OS/2" and "IBM" are trademarks of the International Business Machines Corporation, while "Navigator" and "Netscape" are trademarks of the Netscape Communications Corporation. The client computer system interacts with the browser to select a particular URL, which in turn causes the browser to send a request for that URL or page to the server identified in the URL. Typically the server responds to the request by retrieving the requested page, and transmitting the data for that page back to the requesting client computer system (the client/server interaction is performed in accordance with the hypertext transport protocol ("HTTP")). This page is then displayed to the user on the client screen. The client may also cause the server to launch an application, for example to search for WWW pages relating to particular topics.

Most WWW pages are formatted in accordance with a computer program written in a language known as HTML (hypertext mark-up language). This program contains the data to be displayed via the client's browser as well as formatting commands which tell the browser how to display the data. Thus a typical Web page includes text together with embedded formatting commands, referred to as tags, which can be used to control the font size, the font style (for example, whether italic or bold), how to layout the text, and so on. A Web browser "parses" the HTML script in order to display the text in accordance with the specified format. HTML tags are also used to indicate how the text, graphics, audio and video are manifested to the user via the client's browser.

Most Web pages also contain one or more references to other Web pages, which need not be on the same server as the original page. Such references may generally be activated by the user selecting particular locations on the screen, typically by (double) clicking a mouse control button. These references or locations are known as hyperlinks, and are typically flagged by the browser in a particular manner (for example, any text associated with a hyperlink may be in a different colour). If a user selects the hyperlink, then the referenced page is retrieved and replaces the currently displayed page.

Further information about HTML and the WWW can be found in "World Wide Web and HTML" by Douglas McArthur, p18–26 in Dr Dobbs Journal, December 1994, and in "The HTML SourceBook" by Ian Graham, (John Wiley, New York, 1995).

Enterprises (companies) are considering their usage of the World Wide Web. The first phase, namely the publicity of the company in whatever form, has already occurred. Home pages are commonplace, an essential ingredient for any company which wishes to maintain itself in line with current business practices. The publicity material contains marketing information, product brands and, in some cases, product catalogues.

The second phase, namely to conduct commerce, is emerging. Enterprises are poised to conduct business by way of the World Wide Web. They are seeking to make sales of their products and services, by way of the World Wide Web.

Software infrastructure is coming into existence to enable the progress of this trend. Secure financial protocols have been defined and are being implemented. The provision of firewall technologies offer safeguards to the enterprise, without which the enterprise would not contemplate permitting access to its critical data. Gateway products are becoming available to facilitate connection between the World Wide Web and the server machines of the enterprise.

Thus, many suppliers have begun to sell their goods and services over the World Wide Web as well as placing their catalogues on their Web pages.

Oftentimes, buyers are trying to coordinate a group of interrelated "on-line" purchases of goods and services. For example, to book a two-week trip overseas a buyer may wish to book not only the airline reservation but also the parking at the airport (or bus/train reservations), hotel, rental car and restaurant reservations. This can be a frustrating and confusing experience because if the buyer books the airline reservation, hotel and rental car he may then find that airport parking (and bus/train reservations) are unavailable or too inconvenient to match up with the other booked reservations. This would require having to recontact the suppliers of the booked reservations and trying to renegotiate a new booking. In the case of the airline, this is oftentimes difficult to impossible.

So-called intelligent agents are available to help an "on-line" buyer in these situations. Intelligent agents are computer programs that simulate a human relationship by doing something that another person could otherwise do for you. For example, the Telescript agent software developed by General Magic, a Silicon Valley start-up company, supports the deployment of software agents to act as personal delegates across a computer network ("Telescript" is a trademark of General Magic company). The agent performs various tasks at electronic venues (servers) called "places" which include electronic mailboxes, calendars and marketplaces.

The Telescript agents gather information resourcefully and negotiate deals on behalf of the client buyer (the principal for whom the agent is working). The agent can be customized by each individual buyer/user so that the agent reflects the choices and desires of the buyer/user (client) with respect to what the client is looking for in choosing a supplier of an item. The agents are intelligent in the sense that they can execute contingency plans if the most preferred plan is not feasible given the supplier resources and the general server environment at the time of the agent's dispatch. The Telescript agent can be sent to an electronic florist, ticket seller and restaurant to Perform a shopping trip for the client on the other side of the computer network. The details of such software agents are well known and are explained, for example, in "Internet Agents, Spiders, Wanderers, Brokers, and Bots", Fah-Chun Cheong, New Riders Publishing, Indianapolis, Ind., USA, 1996.

In the situations described above, where an on-line buyer wishes to coordinate a group of interrelated on-line purchases which must all link together in a convenient way, software agents have been quite helpful, but still have not completely made this process convenient for the buyer. Many of these agents have their software structured so that the various transactions are booked in such a way that the agent must expend the least effort in contacting servers etc. That is, as long as the agent can find one possible way to meet all of the items of the package while meeting the client's preferences for each item, the package is assembled and presented to the client for approval. While the agent is relieved from having to perform extra processing steps, this "least effort" approach does not always result in the best possible solution for the client. With this approach, there is a good chance that the client may not be presented with the best possible package, as the known agents seek to minimize the work they must do in fulfilling the client's package.

SUMMARY OF THE INVENTION

According to a first aspect, the present invention provides a method of performing computer-based on-line commerce in which a client computer issues a group of interrelated commercial requests and each one of a plurality of server computers is available to service at least one of said requests, said method, performed by an intelligent agent, comprising steps of: receiving the group of interrelated commercial requests from said client computer; and finding servers which will satisfy said group of requests using client preference levels indicating for each request at least one preferred value which the client would like the agent to use in finding a server to satisfy that request; characterized in that said finding step also uses a client significance level indicating for a corresponding request the relative significance of this request in comparison to the other requests in the group.

Preferably, said intelligent agent uses a table listing client preference levels versus client significance levels for the group of interrelated requests. This way, the agent can easily check the table when putting together the package in order to satisfy both the client's preference levels and significance levels.

Further preferably, the requests are grouped into two significance level groups, the first group being a mandatory group and the second group being an optional group. This way, the agent can use these two groups to decide which requests are absolutely critical to the group and which requests are merely optional. The agent can then report the completed package to the client if all the mandatory requests have been satisfied even if any of the optional requests have not been satisfied.

According to a second aspect, the invention provides an apparatus for carrying out the method steps of the first aspect.

According to a third aspect, the invention provides a computer program product stored on a computer readable storage medium for, when run on a computer, instructing the computer to perform the steps of the method steps of the first aspect.

The present invention places more processing capability in the intelligent agent, as compared to previously known agents, so that the agent must do more work in putting together a package of related items for a client. The agent is not allowed to consider only the client's preferences for what will satisfy each item of the package and thus do the minimum amount of work required to put together a package which satisfies the client's preferences. The agent is given more constraints to work with so that the client is presented with a more optimum package given that particular client's wishes. Specifically, the agent takes into account the significance level given to each item in the package.

BRIEF DESCRIPTION OF THE DRAWINGS

Preferred embodiments of the invention will be described in detail below with reference to the following figures.

DETAILED DESCRIPTION OF THE PREFERRED EMBODIMENTS

Figure 1:
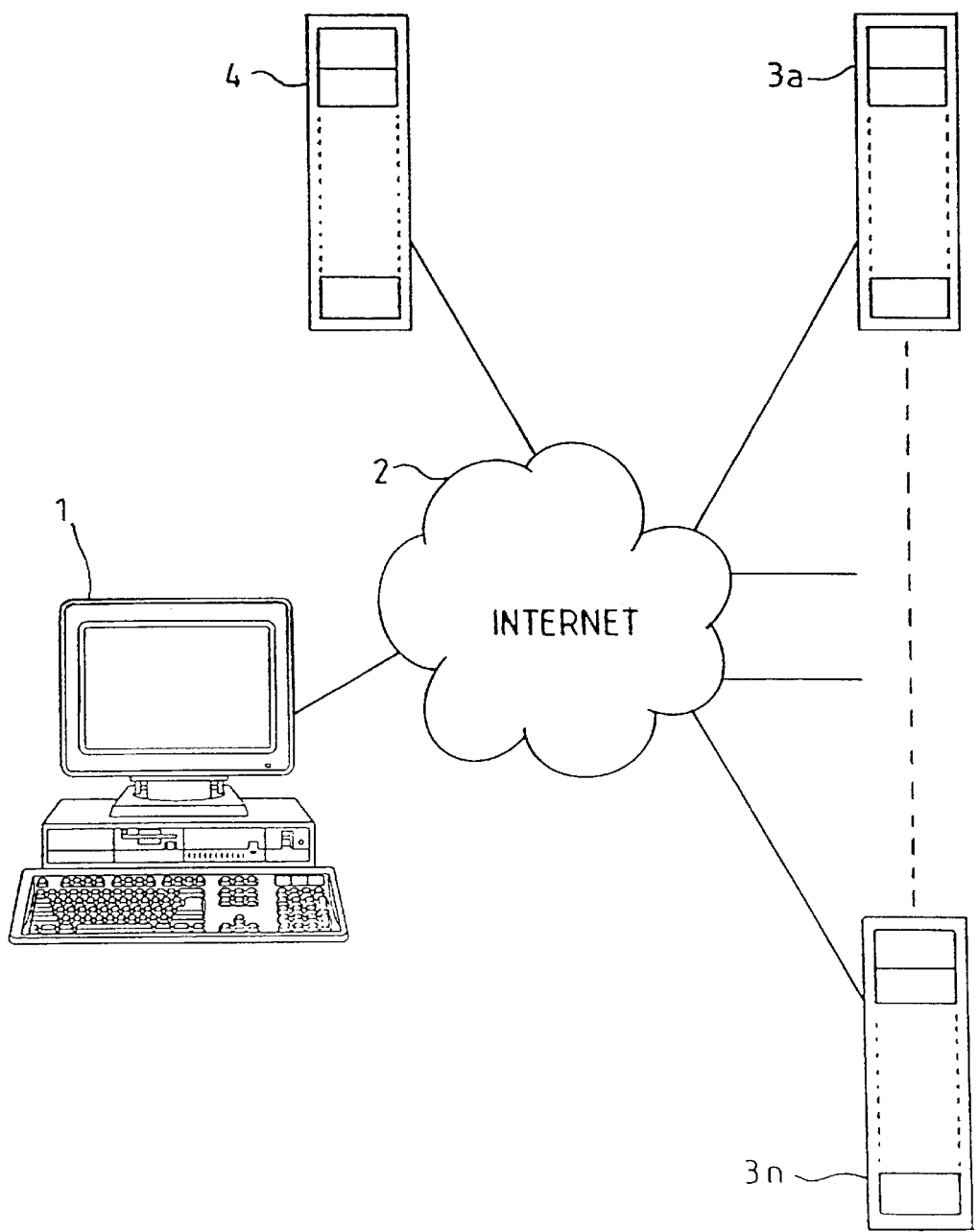
FIG. 1 shows a basic system configuration in which the present invention operates, according to a preferred embodiment.

As shown in FIG. 1, a preferred embodiment of the present invention involves a client computer system 1 running a Web browser and connected to the Internet 2. A plurality of server computer systems 3a–3n are also connected to the Internet and run Web server software in a well known manner. Another computer system 4 is provided for running the intelligent agent software. The client system 1 communicates first with the agent system 4 which in turn contacts the servers 3a to 3n. It should be noted that the agent software does not have to be running on a separate computer system 4 but can be run on the client system 1 or one of the servers 3a to 3n as well.

Figure 2:
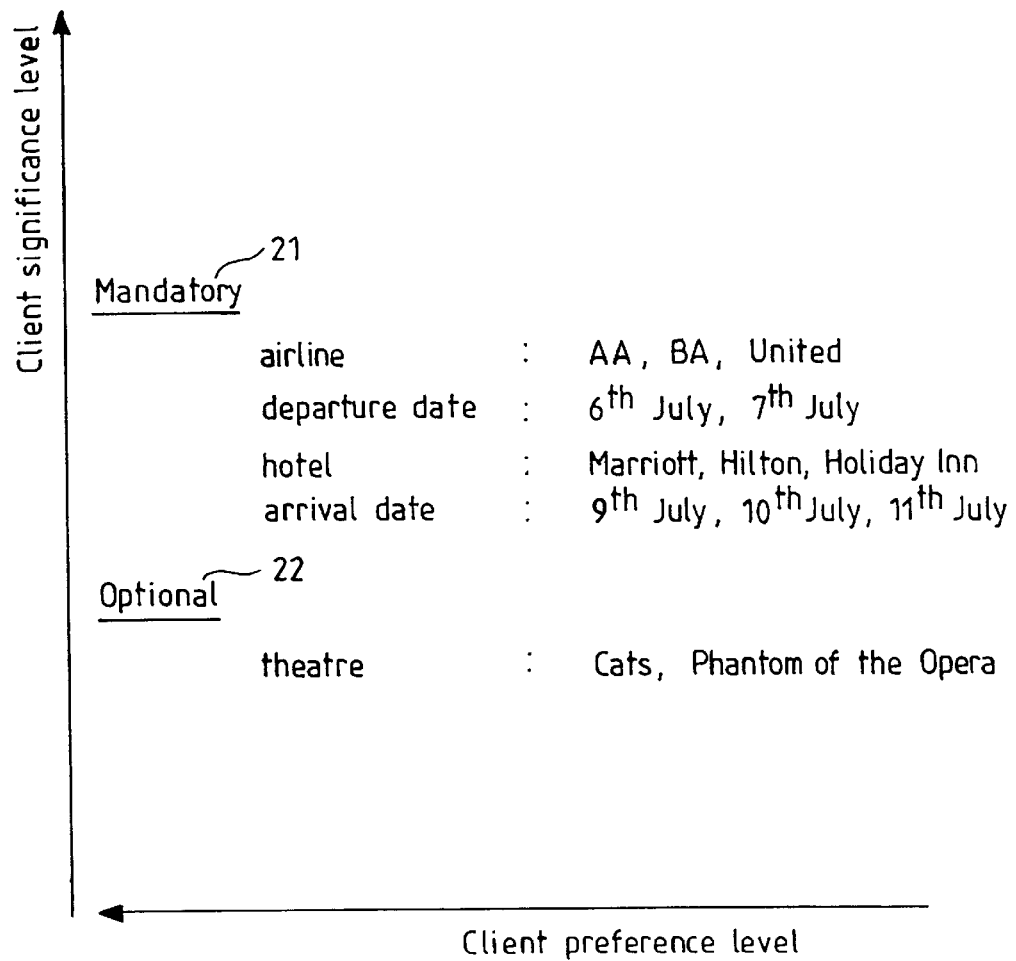
FIG. 2 is a table for use by an intelligent agent, according to a preferred embodiment of the present invention.

The agent system 4 goes out to the various server computer systems 3a–3n and contacts them to determine how suitable each one is in satisfying the various items (e.g., hotel, rental car, airline) of a package of related items which a client has requested the agent 4 to complete. In doing so, the agent 4 uses a two-dimensional table, as shown in FIG. 2. This table has as the vertical dimension the client's significance level (how important this item is as compared to the other items) for each item in the package. As the horizontal dimension the table lists, for each item in the package, the client's preferences for values (e.g., different airlines) which will satisfy that item in the package.

As shown in the FIG. 2, the significance levels can be broken down into two groups: a mandatory group 21 at the higher significance levels and an optional group 22 at the lower levels.

The mandatory group 21 of items are the ones which the agent must be able to satisfy or else the client would rather cancel the whole package. The optional group 22 of items are the ones which the user can go without if the items in the mandatory group 21 are available but the ones in the optional group 22 are not available.

In the example illustrated in FIG. 2, the particular client for which this table was prepared has expressed to the agent 4 that there are four mandatory items which must be attainable or else the client would like to cancel the entire package. These are the airline, the departure date (i.e., the date on which the passenger begins travelling), the hotel and the arrival date (e.g., the date on which the passenger finishes travelling). This particular client has decided (and informed the agent 4) that the client's choice of airline is of utmost significance, the client's choice of departure dates is of second highest significance, the client's choice of hotel is of third highest significance and finally the client's choice of arrival date is of fourth highest significance. This particular client has also decided that it would be nice to attend a theatre performance, but that the trip should not be cancelled if a theatre performance is not available. Thus, the theatre item in the package is designated as an optional item and placed in the optional group 22. In FIG. 2, the mandatory group 21 is placed higher up vertically than the optional group 22, indicating to the agent 4 the higher level of significance of this group 21 as compared to the group 22. Within each group 21 and 22, the items are listed in order of the significance which the client has assigned to the items in relation to the other items.

In the example illustrated in the table, the client would like to attend a business meeting on the 7th of July in New York (leaving from London).

For each item (e.g., the airline item), the client's preferences for values (e.g., airline providers) which will satisfy each item are listed horizontally in the table with increasing preference level being to the left as indicated by the arrow. Thus, for the airline, the client has specified during formation of the table that he prefers American Airlines as his highest preference with British Airways being second and United Airlines being third. This is a personal preference and could be for a variety of reasons personal to the client (e.g., better frequent flyer miles with one airline, better seating, better films, more convenient airports etc.). These airline names are trademarks of the respective owners of the airlines.

For the departure date, the client has indicated that he prefers to leave on 6th July (the day before the 7th July meeting) but that he will accept as a lower preference to fly out on the day of the meeting (7th July).

For the hotel, the client has indicated that he most prefers to stay at the Marriott hotel, with the Hilton and Holiday Inn hotels being his second and third choices, respectively. These hotel names are trademarks of the respective hotel owners.

For the arrival date, the client would most prefer to arrive back in London two days after the meeting (9th July), but will also accept a package which brings him back on 10th July and will even except a package which brings him back on 11th July, although this latter date is the least preferred choice.

For the theatre booking, the client would most prefer to see the musical Cats, but will also accept a package which includes the Phantom of the Opera. These latter musicals are trademarks of the respective theatre companies.

Using this table the agent 4 will then go out to the various servers 3a to 3n to put together a package of items which will be acceptable to the client, following the client's expressed preference levels for each item in the package and following the client's expressed significance levels amongst the various items in the package. The agent 4 could also find more than one package which will satisfy the table and thus present the client with a plurality of packages which he can then choose from.

In the FIG. 2 example, the agent 4 would place the utmost emphasis on obtaining the airline American Airlines (since the airline item is highest in significance level) and will accept more variability when choosing servers which can satisfy the lower significance level items (such as the hotel choice). The arrival date item is lowest in significance level and thus the agent will accept the greatest flexibility in booking this item, meaning that the agent may go to the lowest client preference level (11th of July). On the other hand, the agent would not back down in preference level on a higher significance level item unless this was absolutely necessary to fulfil the mandatory items of the package (e.g., if the lower significance level items are not bookable even at their lowest preference levels).

If the agent succeeds in booking the four mandatory items but cannot book the optional theatre item, the package will simply be presented to the client without the theatre booking.

As shown in FIG. 2, the table can include as items listed by significance level things like the departure date of a trip, even though this is not a traditionally thought of "item" of a trip package (e.g., hotel, airline, rental car). In this way, if the departure date of travel cannot be booked by the agent, and the departure date item is in the mandatory group 21, the entire package will be cancelled. Also, the agent will attach a higher significance to the client's preferences concerning the departure date as compared to the client's preferences concerning the hotel in making the bookings.

Along with the table of FIG. 2, a shadow matrix (not shown) is provided, specifying weighting factors assigned to respective elements of the table. The agent uses the weighting factors in determining the significance and preference levels of each entry in the table. In this way, for example, some table entries can be given equal weighting factors, indicating to the agent that it can choose either one, whichever better fits into the overall package. Besides using simply numbers for the weighting factors, logical expression can also be used. For example, instead of inserting a number as a preference level for an airline choice, the logic expression "any airline that goes to New York except for airlines B, and C" can be used. Also, rather than putting in a value in the table of FIG. 2, the client can put in a "wildcard" character into a preference level entry, specifying that the client will accept any available value that the agent can find to satisfy the package.

Figure 3:
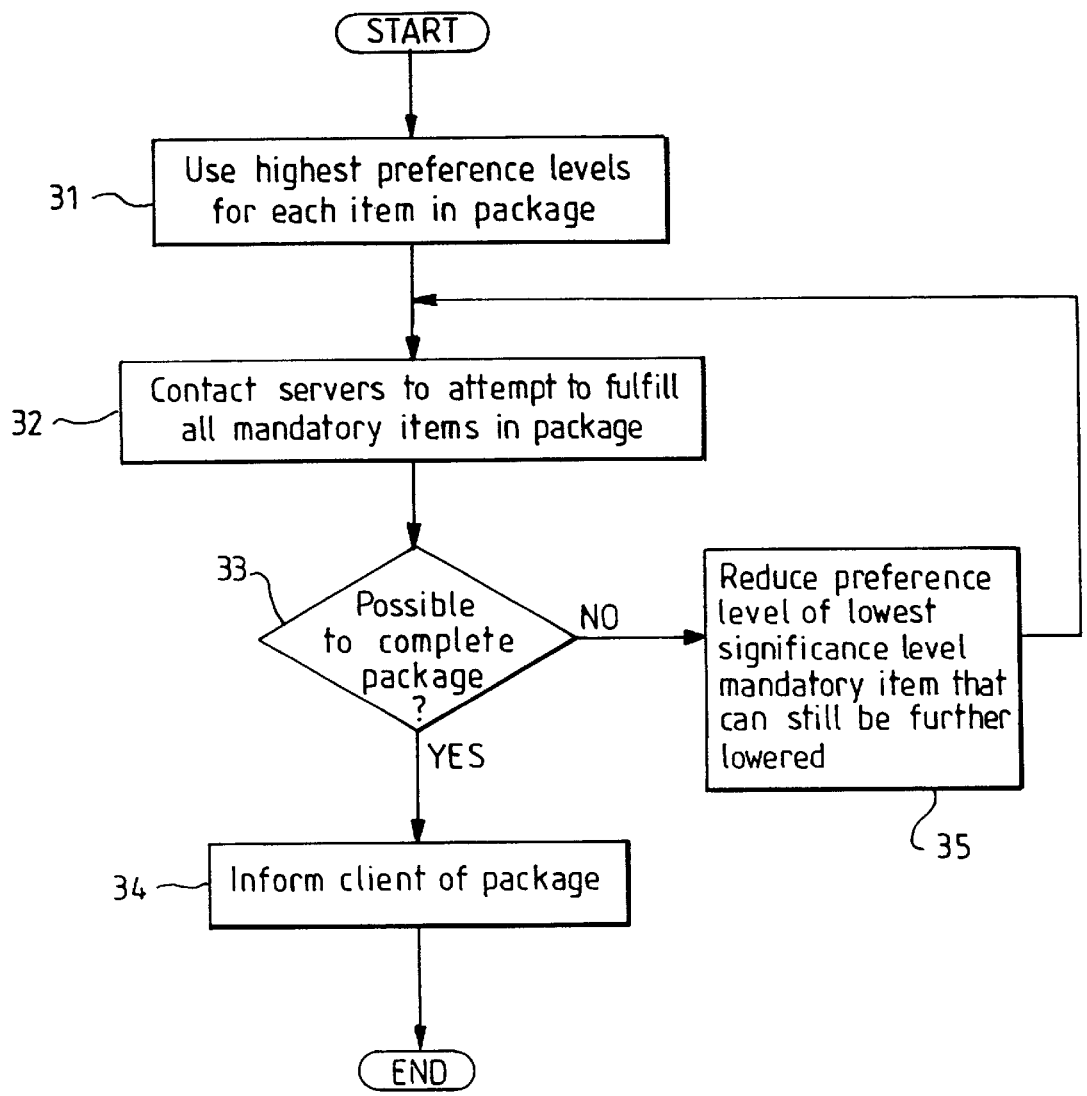
FIG. 3 is a flow chart showing the steps performed by an intelligent agent according to a preferred embodiment of the present invention.

The steps carried out by intelligent agent 4 will now be described in conjunction with the flowchart of FIG. 3.

First, at step 31, the intelligent agent assigns to its search function the highest preference levels for each item in the package and then, at step 32, contacts the servers to attempt to fulfil all mandatory items of the package. This is done because the client would most like to have his highest preference levels fulfilled (American Airlines, departing on 6th July, Marriott hotel, arriving back home on 9th July).

At step 33, the agent determines whether it is possible to fulfil all mandatory items of the package. If so, processing ends, and the agent informs the client of the package (step 34). If not, processing flows to step 35 where the agent reduces the preference level of the lowest significance level mandatory item that can still be lowered further. In the example of FIG. 2, if the agent is not able to book American Airlines, departing on 6th July, Marriott hotel and arriving back home on 9th July, the agent would reduce the preference level of the arrival date to 10th July, as the arrival date item is the lowest significance level mandatory item that can still be further lowered. Control then returns to step 32 where the agent attempts to book this alternate package. If the agent is not able to book this alternate package (American Airlines, departing on 6th July, Marriott hotel and arriving back home on 10th July) the agent reduces the preference level of the arrival date from 10th July to 11th July as the arrival date is still the lowest significance level mandatory item which can still be further lowered. Thus, the agent would then return to step 32 and attempt to book the package American Airlines, departing 6th July, Marriott hotel, arriving home on 11th July.

If, at step 33, the agent determines that it cannot book this latter package, the agent reduces (at step 35) the preference level of the hotel item from Marriott to Hilton and returns the preference level of the arrival date to 9th July and repeats step 32. This happens because at step 35 the hotel item is now the lowest significance level mandatory item that can still be lowered further. Note that the arrival date item cannot be lowered further as it has already been lowered through its full extent in preceding passes of the flowchart.

Once the package is complete (after step 33 yields an answer of YES), the agent can optionally try to fulfil the optional item(s) (e.g., the theatre booking in FIG. 2) and add this to the completed package before presenting it to the client and step 34.

The present invention thus places a higher processing burden on the agent and results in allowing a client to specify, with much more detail, what type of package he would like to receive from an agent. Specifically, the significance of each item in the package, as compared to the other items, can be specified by the client and then used by the agent in putting together the package. The client is thus presented with a package which much more closely suits his preferences and desires as compared to prior intelligent agent systems.

The table described above (e.g., FIG. 2) can be prepared by many different means, such as asking the client questions (e.g., which item is, of highest significance) and then processing the answers into a tabular format. Alternatively, the table can be formed automatically by the agent's observation over time of the client's choices to thus determine which items the client decides to be more significant.

Usually, when one thinks of items of a package, one thinks of items which are directly supplied by a supplier (e.g, hotel, airline, rental car). The present invention also allows the inclusion, as items in the package, information that limit the service to be supplied (e.g, the price of the airline ticket, the departure date, the arrival date). This provides great flexibility in the way that the customer can specify his: preference and significance levels. When these latter types of items are used, the software processing the table can be made to recognize such items through attributes, and through such recognition, optimizations in the flowchart are possible so that potential packages which are known not to be available will not be tried.

We claim:

1. A method of performing computer-based on-line commerce in which a client computer issues a group of interrelated commercial requests and each one of a plurality of server computers is available to service at least one of said requests, said method, performed by an intelligent agent, comprising steps of:

receiving the group of interrelated commercial requests from said client computer;

finding servers which will satisfy said group of requests using client preference levels indicating for each request at least one preferred value which the client would like the agent to use in finding a server to satisfy that request said finding step also uses a client significance level indicating for a corresponding request the relative significance of this request in comparison to the other requests in the group; and assembling a package of related items which satisfy the group of interrelated commercial requests based on the finding step.

2. The method of claim 1 wherein said intelligent agent uses a table listing client preference levels versus client significance levels for the group of interrelated requests.

3. The method of claim 1 wherein said requests are grouped into two significance level groups, the first group being a mandatory group and the second group being an optional group.

4. An intelligent agent apparatus for performing computer-based on-line commerce in which a client computer issues a group of interrelated commercial requests and each one of a plurality of server computers is available to service at least one of said requests, said apparatus comprising:

means for receiving the group of interrelated commercial requests from said client computer;

means for finding servers which will satisfy said group of requests using client preference levels indicating for each request at least one preferred value which the client would like the agent to use in finding a server to satisfy that request said means for finding also uses a client significance level indicating for a corresponding request the relative significance of this request in comparison to the other requests in the group; and means for assembling a package of related items which satisfy the group of inter-related commercial requests based on the finding step.

5. The apparatus of claim 4 wherein said intelligent agent uses a table listing client preference levels versus client significance levels for the group of interrelated requests.

6. The apparatus of claim 4 wherein said requests are grouped into two significance level groups, the first group being a mandatory group and the second group being an optional group.

7. A computer program product stored on a computer readable storage medium for, when run on a computer, instructing the computer to perform a method of performing computer-based on-line commerce in which a client computer issues a group of interrelated commercial requests and each one of a plurality of server computers is available to service at least one of said requests, said method, performed by an intelligent agent, comprising steps of:

receiving the group of interrelated commercial requests from said client computer;

finding servers which will satisfy said group of requests using client preference levels indicating for each request at least one preferred value which the client would like the agent to use in finding a server to satisfy that request said finding step also uses a client significance level indicating for a corresponding request the relative significance of this request in comparison to the other requests in the group; and assembling a package of related items which satisfy the group of inter-related commercial requests based on the finding step.

8. The computer program product of claim 7 wherein said intelligent agent uses a table listing client preference levels versus client significance levels for the group of interrelated requests.

9. The computer program product of claim 7 wherein said requests are grouped into two significance level groups, the first group being a mandatory group and the second group being an optional group.

* * * * *